3,337,604
PROCESS FOR THE PREPARATION OF ALIPHATIC DINITRILES
Bernard Pierre Brossard, Lyon, France, assignor to Rhone-Poulenc S.A., Paris, France, a French body corporate
No Drawing. Filed Nov. 4, 1964, Ser. No. 408,774
Claims priority, application France, Nov. 7, 1963, 952,985; Dec. 5, 1963, 956,177
6 Claims. (Cl. 260—465.2)

This invention relates to the preparation of aliphatic dinitriles.

The present invention provides a process for the preparation of aliphatic dinitriles which comprises heating an aliphatic amidino-carboxylic acid in which the amidino group and the carboxylic acid group are separated by at least one carbon atom, in the presence of a dehydration catalyst and at 260° to 320° C., preferably in the presence of added ammonia.

The reaction may be represented as follows:

in which R is an optionally substituted divalent alkylene radical, preferably alkylene of 4 to 10 carbon atoms such as $-(CH_2)_4-$, $-(CH_2)_5-$, $-(CH_2)_6-$, $-(CH_2)_7-$, $-(CH_2)_8-$, $-(CH_2)_9-$, and $-(CH_2)_{10}-$.

The amidino-carboxylic acids used as starting materials are solid products of high melting point, which may be prepared by catalytic hydrogenation of the corresponding nitrolic acids. The latter are themselves obtained in good yields by oxidation of cycloalkanols with nitric acid at low temperature, e.g. as described by H. C. Godt and J. F. Quinn, J. Amer. Chem. Soc. 78, 1461–1464 (1956), for converting cyclohexanol into 6-nitro-6-hydroximino-hexanoic acid.

The catalytic hydrogenation of nitrolic acids into amidino-carboxylic acids may be carried out at ambient temperature in the presence of catalysts such as platinum or Raney nickel, e.g. by the method described by D. Lonchamp and P. Baumgartner, Comptes Rendus, 257, 669–670 (1963), for the hydrogenation of 6-nitro-6-hydroximinohexanoic acid into 6-amino-6-iminohexanoic acid (also called monoadipamidine) or δ-amidinovaleric acid.

Amidino-carboxylic acids may also be prepared by reducing the corresponding amidoximes by the processes described in United States Patents Nos. 2,375,611 and 2,851,490.

When amidino-carboxylic acids are prepared by reduction of nitrolic acids a certain quantity of the corresponding amido acid is formed in the course of the hydrogenation. However there is no need to purify the mixture and the crude product resulting from the catalytic reduction of nitrolic acids may be used directly without isolation of the amidino-carboxylic acid.

In the new process, the amidino-carboxylic acid is heated at a temperature between 260° and 320° C., in the absence of solvent or in an anhydrous inert solvent medium, and in the presence of a dehydration catalyst. As dehydration catalyst, there may be used any catalyst which may be employed for the preparation of nitriles either by dehydration of the corresponding amides, or by the direct action of ammonia on the corresponding carboxylic acids, e.g. those indicated in "Methoden der Organischen Chemie," Houben-Weyl, "Sauerstoff Verbindungen III," pages 334–335 and 337–338.

Particularly suitable are alumina, phosphoric anhydride, phosphoric acid and its salts, and also catalysts containing both phosphoric acid and boric acid in various proportions and obtained from mixtures of these acids (e.g. as mentioned in the examples below). A phosphoric acid catalyst is conveniently a carrier or an inert support such as kieselguhr.

The water is eliminated as it is formed, either by distillation or by fixation on a dehydrating agent, so as to ensure a preponderant formation of dinitriles, and reduce the proportion of intermediate amido products (e.g. cyanovaleramide and adipamide).

To reduce secondary reactions, the process is advantageously carried out in the presence of ammonia, by bubbling through the reaction mass a current of gaseous ammonia, which may be recovered on leaving the reactor. The reaction may also be carried out in an inert heavy solvent medium such as anthracene, although the presence of such a solvent or diluent is not essential.

The following examples illustrate the process of the invention.

Example 1

Into a vertical cylindrical reactor, having a capacity of 60 cc., provided with a gas inlet and a short packed reflux column through the jacket of which steam is circulated, and followed by an ordinary condenser, a receiver and a wash bottle containing standard sulphuric acid, are introduced 21.6 g. of monoadipamidine (0.15 mole) and 0.6 g. of catalyst consisting of 85% phosphoric acid deposited upon kieselguhr. The mixture is heated to 290° C. in 40 minutes, while a current of ammonia is passed through at a rate of 10 litres per hour. The mixture becomes homogeneous, and is maintained at 300° C. for 1 hour. The water produced in the course of the reaction distills out as it is formed, while the adiponitrile formed refluxes into the reactor. The reaction mass is taken up with 175 cc. of hot benzene, and the insoluble tars (0.7 g.) and the catalyst are seperated. The benzene is driven off from the benzene extract under normal pressure and then under reduced pressure (15 mm. Hg). By distillation of the residue under reduced pressure in an atmosphere of nitrogen, there are isolated 11.8 g. of adiponitrile, B.P./3 mm. Hg=127° C., M.P.=+2° C. The yield is 73% calculated on the amidine employed. A quantity of ammonia substantially identical to the quantity introduced into the reactor is recovered in the wash bottle.

Example 2

Into an apparatus identical with that of the preceding example are introduced 22.2 g. of monoadipamidine and 0.6 g. of a borophosphoric catalyst obtained by calcining at 350° C. a mixture of phosphoric acid and boric acid (47.5/52.5). The mixture is heated to 285° C. in 1 hour, 30 minutes, while a current of ammonia is circulated at a rate of 10 litres per hour, and this temperature is maintained for 1 hour, 15 minutes. As in Example 1, the insoluble tars (0.3 g.) and the catalyst are then separated. Evaporation of the benzene from the benzene extract leaves 15.7 g. of crude products, from which a fraction of 12.1 g., distilling at 111–112° C./1. mm. Hg and identified as adiponitrile, is isolated by distillation in vacuo. Yield 72.5%.

Example 3

Into a three-necked, round-bottomed 100-cc. flask provided with a stirring system, an inert gas inlet and an ordinary condenser, followed by a receiver and a wash bottle containing standard sulphuric acid, are introduced 7.2 g. of monoadipamidine, 20 g. of anthracene and 0.2 g. of a borophosphoric catalyst obtained by calcining at 350° C. a mixture of phosphoric and boric acids (47.5/52.5). This mixture is heated with stirring, the temperature reaching 230° C. at the end of 30 minutes, and then 280° C. in the succeeding 15 minutes. The heating is continued at 280–290° C. for about 15 minutes and it is observed that water and an organic phase slowly distill.

This temperature is maintained for 20 minutes while a slow current of nitrogen is circulated through the reaction mass. The product is then allowed to cool, still under a nitrogen atmosphere.

The combined reaction mass and distillate is taken up with 200 cc. of ethanol, 19.7 g. of insoluble anthracene are separated by filtration and the filtrate is evaporated to dryness. 5.7 g. of a residue are thus obtained, which is taken up with 200 cc. of benzene.

This benzene solution is chromatographed through a column of alumina, and, by elution with benzene, 1.67 g. of adiponitrile, identified by infra-red spectrography and chromatography in the vapour phase, are isolated. The yield is 32% of the theoretical. By elution with a mixture of ethyl acetate and ethanol (75/25) 0.9 g. of crude δ-cyanovaleramide is isolated which, when purified by further chromatography through a column of alumina with a mixture of ethyl acetate and ethanol (50/50) as eluant, gives pure δ-cyanovaleramide which, when recrystallised from benzene, melts at 62° C. The yield is 5.5% of the theoretical.

The quantity of ammonia absorbed by the standard sulphuric acid corresponds to 30% of the theoretical quantity resulting from the pyrolysis of the amidine.

Example 4

Into an apparatus identical with that of Example 1, but having a capacity of 100 cc., are introduced 55 g. of a mixture consisting essentially of monoadipamidine and adipamic acid and 2 g. of the same catalyst as that of Example 1. The mixture is heated to 300° C. in 50 minutes with circulation of gaseous ammonia at a rate of 12 litres per hour. This temperature is maintained for 1 hour, 15 minutes. By treatment identical with that of the preceding examples, 26.7 g. of adiponitrile are isolated, B.P./0.6 mm. Hg=109–111° C., M.P.=+1.6° C.

The mixture of monoadipamidine and adipamic acid used is the crude product resulting from the reduction of 0.4 mole of nitrolic acid with hydrogen under a pressure of 100 bars in the presence of Raney nickel, this acid being in an aqueous medium whose pH has been brought to 6–8 by the addition of ammonia. After filtration of the catalyst and evaporation to dryness, a mixture is obtained containing 0.229 mole of monoadipamidine and 0.1 mole of adipamic acid. This mixture is then converted into adiponitrile as described above, in a yield of 63.5% based on the nitrolic acid employed.

Example 5

In an apparatus identical with that of Example 1, and under the same operating conditions, 22.8 g. of 11-amidinoundecanoic acid (M.P.=303° C.) are treated in the presence of 0.4 g. of catalyst. There are obtained 15 g. of 1,10-dicyanodecane, B.P.=148° C./0.5 mm. Hg, M.P.=20.4° C., in a yield of 78%.

11-amidinoundecanoic acid was prepared by reduction of 12-amino-12-hydroximinododecanoic acid by the method described in United States Patent No. 2,851,490.

I claim:

1. Process for the preparation of an aliphatic dinitrile of formula: NC—(CH$_2$)$_n$—CN in which $n$ is 4 to 10 inclusive which comprises heating at 260° to 320° C. an aliphatic amidino-carboxylic acid of the formula:

$$HOOC—(CH_2)_n—C(:NH)NH_2$$

in the presence of, as dehydration catalyst, alumina, phosphoric anhydride, phosphoric acid or a salt thereof, or a mixture of phosphoric and boric acids.

2. Process according to claim 1 in which the said amidino-carboxylic acid is heated in the presence of ammonia in addition to the said dehydration catalyst.

3. Process according to claim 2 in which the amidino-carboxylic acid is δ-amidino-valeric acid and is heated at 280° to 300° C.

4. Process according to claim 2 in which the amidino-carboxylic acid is 11-amidino-undecanoic acid and is heated at 280° to 300° C.

5. Process according to claim 1 in which the dehydration catalyst is phosphoric acid carried on an inert support.

6. Process according to claim 1 in which the dehydration catalyst is a borophosphoric catalyst obtained by calcining at 350° C. a mixture of approximately equal parts of phosphoric and boric acids.

No references cited.

CHARLES B. PARKER, *Primary Examiner.*

JOSEPH P. BRUST, *Assistant Examiner.*